United States Patent [19]

Sherman et al.

[11] Patent Number: 4,663,052

[45] Date of Patent: May 5, 1987

[54] DRYING PROCESS USING CHABAZITE-TYPE ADSORBENTS

[75] Inventors: John D. Sherman, Chappaqua; Moez M. Nagji, Yonkers; Ronald J. Ross, Upper Nyack, all of N.Y.; Joseph P. Ausikaitis, Wilton, Conn.; Desh R. Garg, Hopewell Junction, N.Y.

[73] Assignee: Union Carbide Corporation, Danbury, Conn.

[21] Appl. No.: 808,173

[22] Filed: Dec. 12, 1985

[51] Int. Cl.[4] .................. B01D 15/04; B01D 53/02
[52] U.S. Cl. ...................................... 210/679; 55/35; 55/75; 210/689
[58] Field of Search ...................... 55/29–35, 55/75; 210/679, 689

[56] References Cited

U.S. PATENT DOCUMENTS 3,224,167 12/1965 Jones .................................. 55/35
3,720,041 3/1973 Alvarez et al. ..................... 55/29

OTHER PUBLICATIONS

Barrer, R. M. et al., "Synthetic Chabazites: Correlation between Isomorphous Replacements, Stability, and Sorption Capacity", (1956), pp. 2892–2903.
Passaglia, E., "The Crystal Chemistry of Chabazites", *The American Mineralogist*, vol. 55, pp. 1278–1301 (1970).
Kraychy, P. N. et al., "Molecular Sieves Dehydrate High-Acid Gas at Pine Creek", *Oil and Gas Journal*, (1966).
Collins, J. J., "A Report on Acid-Resistant Molecular Sieve Types AW-300 and AW-500", *Oil and Gas Journal* (1963).
Material Safety Sheet M-4679-A, Union Carbide Corp., Aug. 1984.
Sherman, John D., "Ion Exchange Separations with Molecular Sieve Zeolites", 83rd National Meeting, American Institute of Chemical Engineers, Houston, Texas, Mar. 20–24, 1977.

*Primary Examiner*—Ivars Cintins

[57] ABSTRACT

A process for the removal of water and other polar compounds from an acidic stream containing water and at least one acid compound comprising contacting the acidic stream with an adsorbent comprising a chabazite-type zeolite wherein said adsorbent has a $M_2O/Al_2O_3$ mole oxide ratio of at least 0.5 where "M" is at least one cation selected from the group consisting of potassium, rubidium and cesium.

26 Claims, No Drawings

DRYING PROCESS USING CHABAZITE-TYPE ADSORBENTS

FIELD OF THE INVENTION

The instant invention relates to a process for drying or purifying acidic streams. The process is carried out with adsorbents containing a chabazite-type zeolite having a $M_2O/Al_2O_3$ mole oxide ratio of at least 0.5 wherein "M" is at least one cation selected from the group consisting of potassium, rubidium and cesium.

BACKGROUND OF THE INVENTION

It is known in the art that zeolitic aluminosilicates (hereinafter "zeolites") have adsorptive properties and that the apparent pore size of zeolites may be modified by the level of hydration of the zeolites. For example, the change in the apparent pore size of an amine modified chabazite is disclosed in U.S. Pat. No. 2,930,447. U.S. Pat. No. 1,813,174 disclosed the selectivity of chabazite for oxygen over hydrogen as a function of the degree of dehydration. Similarly, a 1936 publication, Lamb and Woodhouse (J.A.C.S. 58,2637) describes the adsorptive behavior of chabazite during progressive dehydration.

Methods for the modification of zeolites to enhance their selectivity and/or adsorptive capacity have been disclosed. U.S. Pat. No. 3,224,167 discloses a process for reducing the apparent pore size of sodium A zeolite by using a steaming procedure whereby the oxygen adsorption capacity of a reactivated zeolite has been reduced. One of the particular drying problems noted in U.S. Pat. No. 3,224,167 related to the drying of monochlorodifluoromethane. Under some conditions the monochlorodifluoromethane was observed to decompose and zeolite A was observed to lose some of its capacity to adsorb water. The steaming process of the sodium zeolite A was disclosed to reduce the apparent pore size of the sodium zeolite A and reduce the decomposition of the sodium zeolite A by decreasing the adsorption of monochlorodifluoromethane by the sodium zeolite A.

The use of chabazite-type zeolites to dry and purify process streams containing acid contaminants has been commercially employed. Adsorbents containing chabazite-type zeolites have been employed for natural gas drying, hydrogen drying in hydrogen recycle streams and drying halogenated hydrocarbon streams. The chabazite-type zeolite adsorbents employed heretofore contained a $K_2O/Al_2O_3$ mole oxide up to about 0.3 for such adsorbents. The use of a chabazite-type zeolite (AW500 TM; trademark of Union Carbide Corporation, Danbury, CT.) for several gas drying applications is generally disclosed in *Oil & Gas Journal*, J. J. Collins, Dec. 2, 1963.

DESCRIPTION OF THE INVENTION

The instant invention relates to the process for drying acidic streams. The term "acidic stream" is employed herein to denote a gas or liquid stream containing: (1) acidic compounds, e.g., HCl, $CH_3COOH$ or $HNO_3$; (2) compounds capable of forming acidic compounds in situ alone or in the presence of water; and/or (3) compounds capable of reacting with a zeolite aluminosilicate under the conditions employed for drying and/or purifying the acidic stream. Further, the term "acid stream" includes gas or liquid streams containing compounds which are reactive in the presence of acid catalysts, e.g. olefins. The term "drying" herein is employed to refer to the removal of water or other polar compounds of appropriate size to permit their removal from an acidic stream by use of the adsorbents containing the chabazite-type zeolite described herein.

In addition to the removal of water from acidic streams the instant process may also be employed to purify acidic streams by removing other polar compounds of appropriate size to permit their adsorption by the chabazite-type adsorbents employed in the instant process. For example, HCl, $CO_2$ and $NH_3$ may be removed by use of the potassium ($K_2O/Al_2O_3 > 0.5$) form of an adsorbent containing a chabazite-type zeolite. This purification may be carried out with acidic streams that do not contain water or may be carried out concurrently with the removal of water from such acidic streams.

The instant process comprises contacting a stream containing water and at least one acid, acid generating compound or acid reactive compound under effective water adsorption conditions with an adsorbent comprising an effective amount, e.g., >30 wt. %, of a chabazite-type zeolite having a $M_2O/Al_2O_3$ mole oxide ratio of at least 0.5 wherein "M" is at least one of potassium, rubidium or cesium. "M" is preferably potassium. The $M_2O/Al_2O_3$ mole oxide ratio of the adsorbent is preferably greater than 0.6 and in the most preferred instance is greater than 0.7. The adsorbents having a $M_2O/Al_2O_3$ mole oxide ratio of at least 0.5 and containing a chabazite-type zeolite demonstrate improved resistance to acidic components present in the stream while retaining a high adsorption capacity for water during initial use and after regeneration.

In one embodiment the adsorbent(s) is prepared by use of a chabazite-type zeolite having at least 70 equivalent percent of its zeolitic cations and preferably at least 80 equivalent percent of its zeolitic cations as at least one cation selected from the group consisting of potassium, rubidium and cesium. This embodiment may be employed to provide adsorbents with an extremely high equivalent percent of the desired cation, e.g., potassium, and is believed to be beneficial when synthetic chabazite-type zeolites are employed in the preparation of adsorbents for the instant process.

The instant process employs chabazite-type zeolites having a $M_2O/Al_2O_3$ mole oxide ratio of at least 0.5 where "M" is at least one of potassium, rubidium and cesium. The preferred "M" is potassium. The use of a potassium-chabazite-type zeolite in the adsorption of water from an acidic stream has been observed to provide an adsorbent characterized as being more selective for the adsorption of (water as compared with other stream components), having a high resistance to acidic compounds, having a high adsorptive capacity for water, having a low adsorptive capacity for acidic compounds (acidic, acid forming and/or acid reactive) and having a low reactivity for acid catalyzed reactions.

The adsorbent employed in the instant process contains an effective amount of the chabazite-type zeolite to adsorb at least a portion of the water present in the acidic stream and typically contains at least 30 weight percent of a natural or synthetic chabazite-type zeolite. The term "chabazite-type" zeolite is employed herein according to its common meaning to designate a zeolite formed of hexagonal type layers and containing double 6-rings, e.g., A, B, C where AA, BB or CC is present. The structure of "chabazite-type" zeolite is discussed at pages 56 and 57 of *Zeolite Molecular Sieves,* by Donald W. Breck, John Wiley and Sons, New York, 1974, incorporated herein by reference. Further, the structure of "chabazite-type" zeolites is disclosed in *Atlas of Zeolite Structure Types,* W. M. Meier and D. H. Olson, Polycrystal Book Service, 1978. Zeolites known to be "chabazite-type" zeolites include chabazite, erionite, levynite, zeolite R, zeolite D and zeolite K-G. The physical and chemical characteristics of the zeolite chabazite are disclosed on pages 56, 57, 138 and 212 of *Zeolite Molecular Sieves,* by Donald W. Breck, John Wiley and Sons, New York, 1974, said pages incorporated herein by reference thereto. Chabazite may be obtained as the naturally occurring mineral or synthesized. The natural form of chabazite varies somewhat depending on its source. Some natural chabazites have been observed to contain $K_2O/Al_2O_3$ mole oxide ratios up to 0.48, although most have been reported to contain $K_2O/Al_2O_3$ mole oxide ratios less than 0.3. The chemical and physical properties of some natural ores which contain chabazite are disclosed in "Italian Zeolites 2: Mineralogical and Technical Features of Campanian Tuff," *Industrial Minerals,* pages 97 to 109, September 1984. Erionite is disclosed at pages 56, 57, 143 and 217 of *Zeolite Molecular Sieves,* as aforementioned, said pages incorporated herein by reference. Levynite is disclosed at pages 56, 57, 159 and 229 of *Zeolite Molecular Sieves,* as aforementioned, said pages incorporated herein by reference. Zeolite D is disclosed in U.K. Patent No. 868,846, incorporated herein by reference. Zeolite R is disclosed in U.S. Pat. No. 3,030,181, incorporated herein by reference. Zeolite K-G is disclosed in U.S. Pat. No. 3,056,654, incorporated herein by reference. The preferred zeolite is chabazite. One commercially available chabazite-type zeolite is Union Carbide Corporation's AW500 ™ zeolite (AW500 ™ is a trademark of Union Carbide Corporation, Danbury, Connecticut for a product containing a chabazite-type zeolite.

When the chabazite-type zeolite is derived from a natural ore, the chabazite-type zeolite generally contains several cations. The compositions of natural ores is complex and includes numerous non-zeolite components. The exact nature of the non-zeolite components depends on the origin of the ore. The chabazite-type zeolite is ion-exchanged or treated prior to use in the instant process with an effective amount of at least one cation selected from the group consisting of potassium, rubidium and cesium. The preferred cation is potassium. The cation exchange or treatment is carried out by ion-exchange procedures well known in the art for the cation exchange of zeolitic aluminosilicates containing ion-exchangeable cations.

The ion exchange of chabazite-type zeolites is known in the art, as demonstrated by the publication, "Position of Cations and Water Molecules in Hydrated Chabazite. Natural and Na-, Ca- , Sr- , and K- exchanged Chabazites, " *Zeolites,* Vol. 2, pages 303–309, October 1982. The cation exchange of the chabazite-type zeolite is carried out by contacting an aqueous solution of a water soluble salt of potassium, rubidium and/or cesium with the adsorbent containing the chabazite-type zeolite at a temperature between about 20° C. to about 150° C. for an effective period of time to provide a $M_2O/Al_2O_3$ mole oxide ratio of at least 0.5, preferably at least 0.6, more preferably at least 0.7 where "M" is at least one of potassium, rubidium and cesium. The ion exchange may be carried out by any of the well known procedures, including batch exchanges, column exchanges, countercurrent exchanges and the like. The water soluble salts of potassium, rubidium or cesium may be any salt with cations in a form whereby such can exchange with exchangeable cations present in the chabazite-type zeolite. The ion exchange is generally carried out with an aqueous solution of a water soluble salt, although it is within the scope of this invention to employ mixtures of aqueous and organic solvents, e.g., water/alcohol, or employ polar organic solvents in substitution for water.

When chabazite is the chabazite-type zeolite it may be derived from naturally occurring ores. Naturally occurring ores generally contain other zeolite components, e.g., erionite or phillipsite. The final chabazite-type zeolite present in the adsorbents employed in the instant process will preferably contain at least 30 percent by weight of at least one chabazite-type zeolite, based on the total weight of the adsorbent and the adsorbent will contain a $M_2O/Al_2O_3$ mole oxide ratio of at least 0.5. In one embodiment the final adsorbent has a $K_2O/Al_2O_3$ mole oxide ratio of at least 0.7 and contains a major amount (>50 weight percent) of chabazite and $K_2O$. The adsorbent desirably contains at least 40 and preferably at least 80 weight percent of the chabazite-type zeolite. The adsorbent may contain an inorganic oxide binder as heretofore employed in the preparation of adsorbents. The inorganic oxide binders generally employable in the formation of adsorbents include, silicas, aluminas, silica-aluminas, clays (e.g, kaolin, attapulgite and the like), titanias, borias and the like. The inorganic oxide binder will typically be present in an amount between about 5 weight percent and about 25 weight percent based on the total weight of the adsorbent. When a natural ore is employed the non-zeolite components present in the ore may in some instances be employed as the inorganic oxide binder or as a portion thereof.

The term "acidic stream" is employed herein to denote a gas or liquid stream containing: (1) acidic compounds, e.g., HCl or $HNO_3$; (2) compounds capable of forming acidic compounds in situ in the presence of water; and/or (3) compounds capable of reacting with a zeolite aluminosilicate under the conditions employed for drying the acidic stream. Further, the term "acid stream" includes gas or liquid streams containing compounds which are reactive in the presence of acid catalysts, e.g. olefins. The instant process is particularly well suited for drying acid gases containing halogenated (and/or partially halogenated) hydrocarbons and oxygenated hydrocarbons (alcohols, ethers, aldehydes, organic acids, ketones). Halogenated and oxygenated hydrocarbons include halogenated and oxygenated methane and ethane derivatives such as methyl halides (F, Cl, Be or I) monochlorodifluoromethane, dibromomethane, monochloropentafluoroethane, trichlorotrifluoroethane, trichlorotrioiodoethane, dichlorotetrafluoroethane, tetrachlorodifluoroethane, dichloromonofluoromethane, dichloromonoiodomethane, tetrafluoromethane, dichlorofluoromethane, monochlorotrifluoromethane, trichloromonofluoromethane trifluoromonochloromethane methanol, ethanol, formaldehyde, acetic acid, acetone and dimethylether. The instant process may be employed for halogenated and oxygenated hydrocarbons broadly but is preferably employed to dry gaseous hydrocarbons containing 1 to 5 carbon atoms. The instant process may also be employed to dry hydrogen and inert gases, e.g., $N_2$, containing acidic components. Accordingly, the instant process is useful for a wide range of drying applications where acid resistant adsorbents are believed to be beneficial, including:

| Acidic Stream | Impurity | Acid Component |
|---|---|---|
| Reformer Recyle Hydrogen | $H_2O$ | HCl |
| Generated Nitrogen | $H_2O$ | $NO_2$ |
| Natural Gas | $H_2O$ | $CO_2, H_2S$ |
| Flue Gas | $H_2O$ | HCl |
| Chloroform | $H_2O$ | HCl |
| Trichloroethylene | $H_2O$ | HCl |
| Vinyl chloride | $H_2O$ | HCl |
| Chlorine | $H_2O$ | HCl |
| Halogenated Hydrocarbons (F, Cl, Br and I) | $H_2O$ | Halogen Compounds |
| Organic Acids | $H_2O$ | Organic acids |
| Fluorocarbons | $H_2O$ | Alcohol |
| Generated Hydrogen | $H_2O$ | HCl |

The instant process is carried out under effective process conditions of pressure, temperature and time to provide for removal of the desired amount of water from the acidic stream comprising water and at least one acid compound, acid generating compound and/or acid reactive compound. The effective pressure is generally between about 14.7 psia and about 2000 psia. Although subatmospheric pressures may be employed with gaseous acidic streams, a superatmospheric pressure is normally employed to contact the gas or liquid stream with the adsorbent. The effective process temperature is typically between about 0° C. and about 300° C. and is preferably between about 50° C. and about 250° C. The effective temperature is related, at least in part, to the particular acidic compound(s) present in the acid stream and the amount of water present in the stream. For the removal of water from halogenated methane and ethane derivatives, the effective temperature is typically between about 0° C. and about 75° C. The contact time during which the stream is contacted with the adsorbent will vary depending on the acidic compounds present and the amount of water present in the acidic stream. The stream is typically contacted with the adsorbent by contacting the stream with the adsorbent at effective contact times between about 0.01 minute and about 1 hour. The contacting is typically carried out by passing the stream through the adsorbent bed such that the actual time during which a given portion of the stream is in contact with some portion of the adsorbent bed may be up to several hours.

The adsorbent is generally at least partially activated before use by removing at least a portion of the water from the adsorbent by calcination or by other suitable means. The activation of the adsorbent is generally carried out at a temperature of about 100° C. or greater in the presence of air or other gas, e.g., nitrogen, argon, hydrogen and the like. The activation of the adsorbent is typically carried out by heating the adsorbent in air at a temperature between about 200° C. and about 600° C. for a period of time from about 0.1 hours to about 1 hour or more. An activation procedure is also employed to regenerate the adsorbent after the adsorbent has been contacted with the acidic stream for a period of time whereby water is removed from the acidic stream. The regeneration may be carried out by contacting air or an inert gas, e.g. nitrogen, with the adsorbent at a temperature of at least 100° C. and preferably between about 150° C. to 300° C. The regenerated adsorbent may then be employed in the instant process. Of course, the regeneration also serves to activate the adsorbent, as aforementioned. In this manner an adsorbent bed containing the chabazite-type zeolite may be employed in adsorption/regeneration cycles.

In one embodiment water is removed from a gas stream containing methylene chloride and water by contacting the gas stream with an adsorbent comprising at least one chabazite-type zeolite wherein the adsorbent contains at least 40 percent by weight of said chabazite-type zeolite and said adsorbent has a $K_2O/Al_2O_3$ mole oxide ratio of at least 0.6 and preferably at least 0.7. The gas stream is contacted with the adsorbent under effective conditions for the adsorption of water in preference to methylene chloride. Such effective conditions generally include an effective temperature between about 50° C. and about 250° C. and an effective pressure between about 14.7 psia and about 500 psia.

The following examples are provided to illustrate the invention and are not intended to be limiting thereof:

EXAMPLE 1

The effect of the $M_2O/Al_2O_3$ (where "M" is potassium) mole oxide ratio on the adsorption characteristics of chabazite-type zeolites was evaluated using four different chabazite-containing adsorbents and a 3A zeolite. Two of the adsorbents were obtained and employed as comparative adsorbents and two adsorbents were prepared by treatment with potassium chloride.

The first sample was a commercially available chabazite-type zeolite sold by Union Carbide Corporation under the trademark LINDE AW500 TM. The AW500 was bonded with 10 percent by weight of a clay. This material was in the form of ⅛-inch pellets and was denominated "Adsorbent-1". A 100 gram sample of the pellets was placed in a column and potassium treated by contact with 30 liters of 1 molar potassium chloride formed by dissolving potassium chloride in water. The potassium chloride solution was contacted with the sample at a temperature of 95°–100° C. over a period of about eleven hours. The 100 gram sample was then washed with three liters of 0.1 normal solution (aqueous) of potassium chloride. The sample was then dried in air. This potassium-exchanged material was denominated "Adsorbent-2" and is an adsorbent of the type employed in the instant process.

A second chabazite-type zeolite sample was obtained. This sample was derived from a naturally occurring chabazite-containing ore. The naturally occurring material was bonded with 10 percent by weight of a clay. This sample was denominated "Adsorbent-3". This material was in the form of a 14×30 Mesh powder. A 100 gram sample of this material was treated with solutions of potassium chloride as described above for Adsorbent-2. This potassium treated sample was denominated "Adsorbent-4".

Chemical analysis of the above adsorbents gave the following molar oxide ratios:

| Mole Oxide Ratio | Adsorbent-1[1] | Adsorbent-2[1] | Adsorbent-3[2] | Adsorbent-4[2] |
|---|---|---|---|---|
| $K_2O/Al_2O_3$ | 0.06 ± 0.02 | 0.77 ± 0.02 | 0.30 ± 0.02 | 0.79 ± 0.02 |
| $Na_2O/Al_2O_3$ | 0.26 | 0.03 | 0.14 | 0.09 |
| $MgO/Al_2O_3$ | 0.16 | 0.08 | 0.17 | 0.08 |
| $CaO/Al_2O_3$ | 0.45 | 0.06 | 0.57 | 0.21 |
| $SiO_2/Al_2O_3$ | 6.1 ± 0.2 | 6.3 ± 0.2 | 5.5 ± 0.2 | 5.6 ± 0.2 |

[1] Analysis of adsorbents, including the 10 weight percent clay binder in the analyses.
[2] Analysis of adsorbents, exclusive of the 10 weight percent clay binder.

The third zeolite sample was Union Carbide Corporation Type 3A zeolite bonded with about 15 to 25 percent by weight of a clay and was employed in the form of ⅛-inch pellets. This sample was denominated "Adsorbent-5".

The five adsorbents were evaluated at room temperature (18° C.-22° C.) for their sorption capacities for $H_2O$, $CO_2$, ethane and methyl chloride. The results were as follows:

| Adsorbent | Sorption Capacities[a] | | | | |
|---|---|---|---|---|---|
| | $H_2O$ | $CO_2$ | Ethane | Methyl Chloride(ME) | ME/$H_2O$ |
| Adsorbent-1[b] | 15.3 | 12.7 | 4.0 | 13.9 | 0.91 |
| Adsorbent-2[c] | 12.6 | 10.4 | 3.6 | 9.9 | 0.79 |
| Adsorbent-3[b] | 12.7 | 8.7 | 3.4 | 9.4 | 0.74 |
| Adsorbent-4[c] | 10.7 | 8.2 | 0.6 | 2.2 | 0.21 |
| Adsorbent-5[b] | 18.8 | 0.5 | nil | 0.3 | 0.02 |

[a] Sorption capacities given as grams per 100 grams of the adsorbent. The sorption capacities were carried out at room temperature and at 4.6 Torr ($H_2O$), 250 torr ($CO_2$, $C_2H_6$ and methylchloride).
[b] Comparative examples.
[c] Adsorbents according to the instant invention.

The above sorption capacities demonstrate the significant decrease in the adsorption of ethane and methyl chloride by the adsorbents (Adsorbent-2 and Adsorbent-4) having $K_2O/Al_2O_3$ mole oxide ratios greater than 0.7 while still having a high adsorption for water.

EXAMPLE 2

The four adsorbents identified in example 1 as Adsorbent-1, Adsorbent-2, Adsorbent-3 and Adsorbent-4 were evaluated for their ability to dry a stream comprising water and methyl chloride. The four adsorbents were evaluated using thermogravimetric analysis (TGA) with a DuPont TGA Analyzer. The evaluation was carried out with about 40 milligrams of each adsorbent sample. The sample was placed in the pan of the TGA apparatus. A 0.11 standard cubic foot/hour (SCF/H) flow of dry nitrogen was passed around the case surrounding the TGA apparatus during the analysis. The dry nitrogen gas was passed over the adsorbent sample and then removed via a vent. The sample weight was recorded as a function of time for each sample as the sample was heated at 10° C./minute from room temperature to 300° C. The temperature was maintained at 300° C. until the sample obtained a constant weight between about 30 and about 40 minutes. During this period the sample dropped from its initial weight ($W_i$) to its activated weight ($W_a$). The temperature was maintained at 300° C. as methyl chloride gas was introduced to the TGA apparatus at a flow rate of 0.05 SCF/H. The methyl chloride gas was introduced by mixing with the dry nitrogen gas. The sample was contacted with methyl chloride until a constant weight ($W_f$) was achieved. The increase in the weight of the sample is due to the reaction of the methyl chloride with the adsorbent sample with the formation of a non-desorbable residue on the sample. This non-desorbable residue is indicated by the maintenance of the sample's weight after the contact with methyl chloride is stopped and the sample is purged by contact with the dry nitrogen for ten minutes at 300° C. The weight percent gain by each sample is calculated as follows:

$$\text{Percent Weight Gain} = \frac{(W_f - W_a)}{W_a} \times 100$$

The results of the evaluation were as follows:

| Adsorbent | Percent Weight Gain |
|---|---|
| Adsorbent-1 | 10.3 |
| Adsorbent-2 | 3.5 |
| Adsorbent-3 | 5.2 |
| Adsorbent-4 | 1.7 |

Adsorbent-2 and Adsorbent-4 are potassium forms of Adsorbent-1 and Adsorbent-3, respectively. The lower percent weight gain by Adsorbent-2 and Adsorbent-4, relative to Adsorbent-1 and Adsorbent-3, respectively, indicates the increased resistance of the potassium treated samples to acidic compounds. This increased resistance to degradation is desirable in the adsorption of water from acidic streams.

EXAMPLE 3

The adsorbents denominated in example 1 as Adsorbent-1 and Adsorbent-4 were evaluated for drying a natural gas stream. Adsorbent-1 is a commercially available adsorbent containing a chabazite-type zeolite and available from Union Carbide Corporation under the trademark AW500 TM. Adsorbent-4 contains a potassium-exchanged chabazite-type zeolite according to the instant invention. The two adsorbents were contacted with a a lean natural gas containing about 1% $CO_2$ and about 10 ppm $H_2S$. The adsorbents were tested by carrying out thirty adsorption/regeneration cycles wherein each adsorbent (in 5 pound zeolite beds) was contacted with a natural gas stream at 500 psig at 100° F. for 1 hour and then regenerated at 450 psig at 475° F. for 1 hour with the natural gas stream (average molecular weight of about 18 and about 7 pounds of $H_2O$ per million cubic feet (SCF)). The water capacity (wt. % water adsorbed at 4.6 torr and room temperature) and the weight percent carbon present on the adsorbents were measured. The water capacity and weight percent carbon present on the adsorbent, before and after the evaluation, were as follows:

| | Adsorbent-1 | | Adsorbent-4 | |
|---|---|---|---|---|
| | Fresh[1] | Spent[2] | Fresh[1] | Spent[2] |
| Water Capacity | 16.5 | 15.6 | 12.7 | 10.6 |
| Carbon Deposit | <0.1 | 1.36 | <0.1 | 0.62 |

[1] "Fresh" indicates the adsorbent before evaluation.
[2] "Spent" indicates the adsorbent after the thirty cycle evaluation.

What is claimed is:

1. The process for the removal of water from an acidic stream containing one or more acid compounds and water wherein said process comprises contacting said acidic stream with an adsorbent under effective conditions for the adsorption of water wherein said adsorbent comprises an effective amount of a chabazite-type zeolite wherein said adsorbent has a $M_2O/Al_2O_3$ mole oxide ratio of at least 0.5 where "M" is at least one cation selected from the group consisting of potassium, rubidium or cesium.

2. The process of claim 1 wherein the $M_2O/Al_2O_3$ mole oxide ratio is at least 0.6.

3. The process of claim 2 wherein the $M_2O/Al_2O_3$ is at least 0.7.

4. The process of claim 2 wherein said adsorbent has been activated at a temperature of about 100° C. or greater in the presence of air.

5. The process of claim 1 wherein said chabazite-type zeolite is at least one zeolite selected from the group consisting of chabazite, erionite, levynite, zeolite D, zeolite R and zeolite K-G.

6. The process of claim 5 wherein said chabazite-type zeolite is chabazite.

7. The process of claim 1 where "M" is potassium.

8. The process of claim 7 wherein said chabazite-type zeolite is chabazite, said $M_2O/Al_2O_3$ mole oxide ratio is at least 0.7 and "M" is potassium.

9. The process of claim 1 wherein one or more polar compounds are removed from said acidic stream with removal of water.

10. The process of claim 9 wherein said polar compound is at least one polar compound selected from the group consisting of HCl, $CO_2$ and $NH_3$.

11. The process of claim 1 wherein said acidic stream comprises at least one halogenated hydrocarbon.

12. The process of claim 11 wherein said halogenated hydrocarbon is selected from the group consisting of halogenated methane and ethane derivatives.

13. The process of claim 1 wherein said acidic stream comprises at least one oxygenated hydrocarbon.

14. The process of claim 13 wherein said oxygenated hydrocarbon is selected from the group consisting of alcohols, ethers, aldehydes, organic acids, ketones and mixtures thereof.

15. The process of claim 1 wherein said adsorbent comprises at least 30 percent by weight of said chabazite-type zeolite.

16. The process of claim 15 wherein said adsorbent comprises at least 80 percent by weight of said chabazite-type zeolite.

17. The process of claim 1 wherein said adsorbent contains between about 5 and about 25 percent by weight inorganic oxide binder.

18. The process of claim 1 wherein said effective conditions are an effective temperature between about 0° C. and about 300° C. and an effective pressure between about 14.7 psia and about 2000 psia.

19. The process of claim 1 wherein said acidic stream is a gaseous stream.

20. The process of claim 1 wherein said acidic stream is a liquid stream.

21. The process of claim 1 wherein said acidic stream is selected from the group consisting of reformer recycle hydrogen, generated nitrogen, natural gas, flue gas, chloroform, trichloroethylene, vinyl chloride, chlorine, organic acids, fluorocarbons and generated hydrogen.

22. The process of claim 21 wherein said adsorbent comprises at least 70 percent by weight of said chabazite-type zeolite.

23. The process of claim 21 wherein said chabazite-type zeolite is chabazite.

24. The process of claim 21 wherein said chabazite-type zeolite is a mixture of chabazite and erionite.

25. The process for the removal of water from a gaseous stream comprising methyl chloride and water wherein said process comprises contacting said gaseous stream at an effective temperature between about 50° C. and about 250° C. and at an effective pressure between about 14.7 psia and about 500 psia with an adsorbent comprising at least 40 weight percent of at least one chabazite-type adsorbent wherein said adsorbent has a $K_2O/Al_2O_3$ mole oxide ratio of at least 0.6.

26. The process of claim 25 wherein the $K_2O/Al_2O_3$ is at least 0.7.

* * * * *